US012724969B2

(12) United States Patent
Tran et al.

(10) Patent No.: US 12,724,969 B2
(45) Date of Patent: Sep. 1, 2026

(54) ELECTRONIC COMMUNICATIONS SIGNATURE RECOGNITION FOR PRIVACY PRESERVING COMPUTER OPERATIONS

(71) Applicant: International Business Machines Corporation, Armonk, NY (US)

(72) Inventors: Huy Tran, San Jose, CA (US); David Christopher Ferguson Rayner, San Jose, CA (US); Qing Wang, Sunnyvale, CA (US); Apurv Ray Johar, Dublin, CA (US); Thomas L Watters, North Las Vegas, NV (US); Steven Nicholas Eliuk, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 18/736,800

(22) Filed: Jun. 7, 2024

(65) Prior Publication Data

US 2025/0378273 A1 Dec. 11, 2025

(51) Int. Cl.
*G06F 40/295* (2020.01)
*G06F 40/284* (2020.01)

(52) U.S. Cl.
CPC .......... *G06F 40/295* (2020.01); *G06F 40/284* (2020.01)

(58) Field of Classification Search
CPC ............................ G06F 40/295; G06F 40/284
USPC ................................ 704/202, 231–232, 251
See application file for complete search history.

(56) References Cited

U.S. PATENT DOCUMENTS 8,103,727 B2 1/2012 Lin
10,110,533 B2 10/2018 Jagota
11,055,327 B2 7/2021 Sorensen
11,323,406 B2 5/2022 Glidden et al.
2013/0173718 A1* 7/2013 Bhat .................. G06Q 10/107 709/206
2015/0254238 A1* 9/2015 Waibel .................... G06F 40/58 704/4
2015/0302084 A1 10/2015 Stewart et al.
2021/0182677 A1* 6/2021 Gauthier ............... G06N 3/044
(Continued)

OTHER PUBLICATIONS

"Email Signature Detector", Github, accessed online Apr. 15, 2024, 4 pages.

(Continued)

*Primary Examiner* — George C Monikang
(74) *Attorney, Agent, or Firm* — CANTOR COLBURN LLP; Anthony Mauricio Pallone

(57) ABSTRACT

Mechanisms are provided for executing a privacy preserving computing operation. Features are extracted from line(s) of an electronic communication. Trained machine learning (ML) computer model(s) process the extracted features and generate classification output(s) for the line(s). The ML computer models process the features and generate a classification output for each line which specifies, for corresponding lines, a corresponding classification of the corresponding line as to whether it is a signature line or non-signature line, based on patterns in the features. Each line is annotated with metadata specifying the corresponding classification of the line based on the classification output, to generate an annotated set of data. The privacy preserving computing operation is executed on the electronic communication based on the annotated set of data.

18 Claims, 5 Drawing Sheets

(56) References Cited

U.S. PATENT DOCUMENTS

| | | | | |
|---|---|---|---|---|
| 2022/0147714 | A1 | 5/2022 | Reyderman | |
| 2024/0314156 | A1* | 9/2024 | Lingarkar | G06N 20/00 |

OTHER PUBLICATIONS

"Forge: Email dataset for email signature parsing", Github, accessed online Apr. 15, 2024, 2 pages.
Carvalho, Vitor R. et al., "Learning to Extract Signature and Reply Lines from Email", Proceedings of the Conference on Email and Anti-Spam, vol. 2004, Jul. 30-31, 2004, 8 pages.
Cukierski, Will, "The Enron Email Dataset", Kaggle, accessed online Apr. 15, 2024, 1 page.
Harmening, Nils, "Email Signature Extraction", Github, accessed online Apr. 15, 2024, 3 pages.
Lampert, Andrew et al., "Segmenting Email Message Text into Zones", Proceedings of the 2009 Conference on Empirical Methods in Natural Language Processing, Aug. 6-7, 2009, 10 pages.
Mayer, Peter et al., ""I don't know why I check this . . . "—Investigating Expert Users' Strategies to Detect Email Signature Spoofing Attacks", Proceedings of the Eighteenth Symposium on Usable Privacy and Security (SOUPS 2022), Aug. 8-9, 2022, 21 pages.
Minkov, Einat et al., "Extracting Personal Names from Email: Applying Named Entity Recognition to Informal Text", Proceedings of Human Language Technology Conference and Conference on Empirical Methods in Natural Language Processing (HLT/EMNLP), Vancouver, Oct. 2005, 8 pages.
Muttineni, Divya et al., "Signature Extraction from E-Mails", A Paper Submitted to the Graduate faculty of the North Dakota State University of Agriculture and Applied Science, Oct. 2016, 41 pages.
Polle, Jean Baptiste, "An LSTM-based Approach for Email Signature Identification", Medium, Sep. 23, 2021, 14 pages.
Repke, Tim et al., "Bringing Back Structure to Free Text Email Conversations with Recurrent Neural Networks", European Conference on Information Retrieval, Mar. 26-29, 2018, 12 pages.
Tang, Yong et al., "An Automated Signature-Based Approach against Polymorphic Internet Worms", IEEE Transactions on Parallel and Distributed Systems, vol. 18, No. 7, Jul. 2007, 14 pages.
Violino, Bob, "A.I. is helping hackers make better phishing emails", CNBC, Jun. 8, 2023, 8 pages.

* cited by examiner

Definition: A business email signature (ES) is unique per person and contains an arbitrary number of PIs

| ES line classification | Simple example of lines in an email thread $l^j$ | |
|---|---|---|
| Not ES | Line $l_1^j$ | From: |
| Not ES | Line $l_2^j$ | To: |
| Not ES | | .... |
| Not ES | | ... |
| ES | Line $l_i^j$ | Email sign-off |
| ES | Line $l_{i+1}^j$ | Person name |
| ES | Line $l_{i+2}^j$ | Job title |
| ES | Line $l_{i+3}^j$ | Team name |
| ES | Line $l_{i+4}^j$ | TalentID |
| ES | Line $l_{i+5}^j$ | SlackID |
| ES | Line $l_{i+6}^j$ | Personal quote |
| ES | Line $l_{i+7}^j$ | Date-of-absence |
| ES | Line $l_{i+8}^j$ | Confidential statement |

Problem statement: Given a dataset L having a series of lines extracted from m number of email threads, each thread has an arbitrary number of lines (< n lines); classify each line as an ES or not an ES $$\mathbf{L} = l_1^1, l_2^1, \ldots, l_{<n}^1, l_1^2, l_2^2, \ldots, l_{<n}^2, \ldots, l_1^m, l_2^m, \ldots, l_{<n}^m$$

Determine if line $l_i^j$ is ES or not for j in 1..m and i in 1..<n

*FIG. 2*

ELECTRONIC COMMUNICATIONS SIGNATURE RECOGNITION FOR PRIVACY PRESERVING COMPUTER OPERATIONS

BACKGROUND

The present application relates generally to an improved data processing apparatus and method and more specifically to an improved computing tool and improved computing tool operations/functionality for electronic communications signature recognition for privacy preserving computer operations.

One area, of many, where privacy preserving computer operations are performed on data is in the servicing of data subject access requests. A data subject access request (DSAR) is a formal request made by an individual, also referred to as the data subject, and directed to a particular organization or company, to obtain information about the data subject's personal data that is held by the organization or company, and/or receive a copy of the personal data, and other supplementary information. Various legislation provides individuals with the right to submit DSARs in order to access their personal data, delete, correct, and/or restrict access to the personal data. For example, the European Union's General Data Protection Regulation (GDPR) and the California Consumer Privacy Act (CCPA) are examples of some legislation that gives individuals the right to request their personal data from organizations and companies.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer-implemented method, in a data processing system, is provided for executing a privacy preserving computing operation. The method comprises retrieving a set of data, from a data storage, that comprises an electronic communication corresponding to the privacy preserving computing operation. The method further comprises extracting first features from one or more first lines of the electronic communication. The method also comprises processing, by one or more trained machine learning computer models, the extracted first features as input to the one or more trained machine learning computer models and which generate classification outputs for the one or more first lines. The one or more trained machine learning computer models process the first features and generate a classification output for each first line in the one or more first lines, which specifies, for a corresponding first line in the one or more first lines, a corresponding classification of the corresponding first line as to whether it is a signature line or non-signature line, based on patterns in the first features. The method further comprises annotating each first line in the one or more first lines with metadata specifying the corresponding classification of the first line based on the classification output, to thereby generate an annotated set of data. In addition, the method comprises executing the privacy preserving computing operation on the electronic communication based on the annotated set of data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an example diagram that further illustrates an example problem statement for the problem of signature identification in electronic communications which is addressed by the improved computing tool and improved computing tool operations/functionality of the illustrative embodiments;

DETAILED DESCRIPTION

Figure 1:
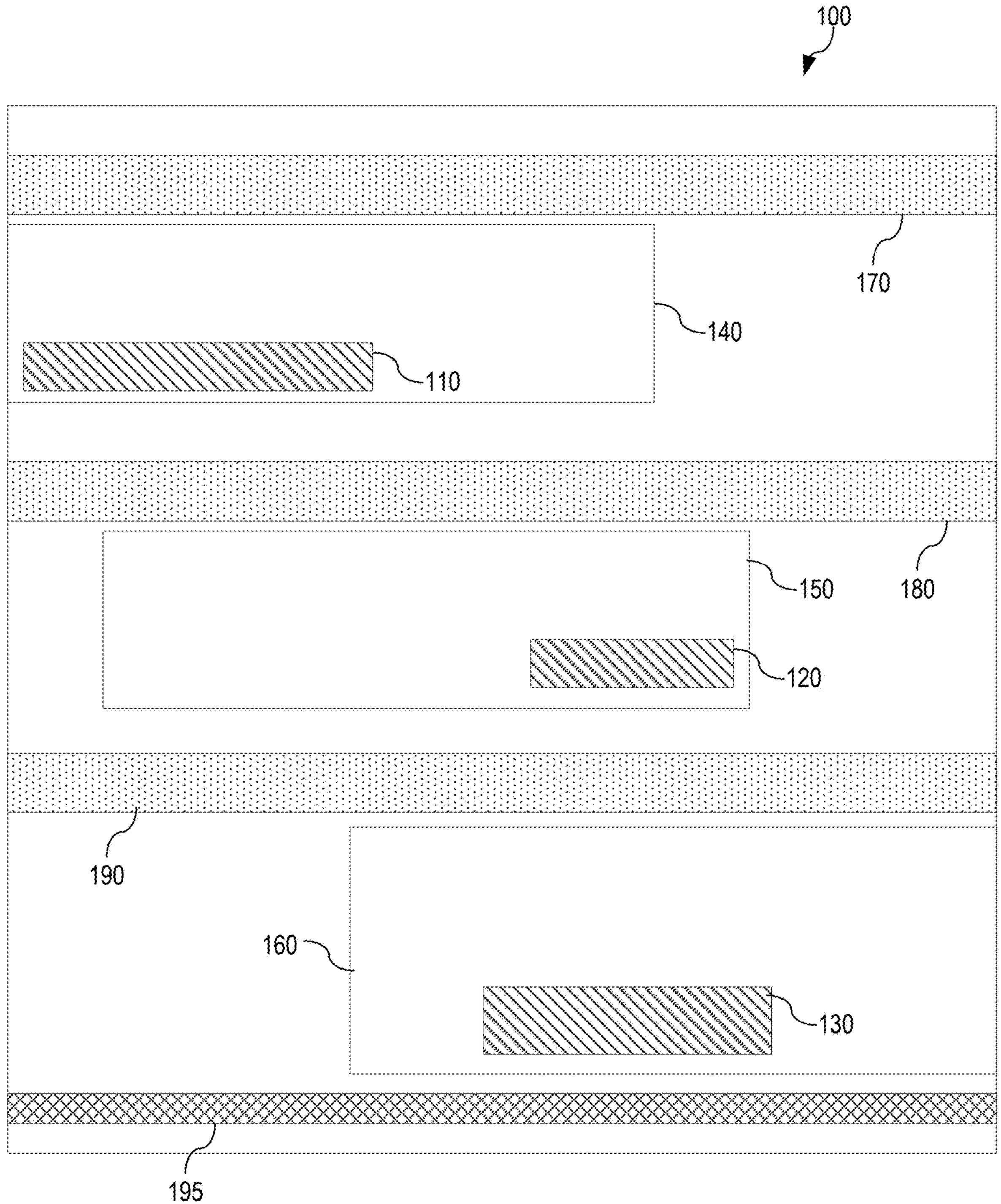
FIG. 1 is an example diagram illustrating the variability of the location of email signatures (ES) in an email chain or thread.

The illustrative embodiments provide an improved computing tool and improved computing tool operations/functionality for electronic communication signature recognition for privacy preserving computer operations. Such privacy preserving computer operations may be any computer operation in which the privacy of personal information (PI) of individuals is to be maintained such that unauthorized persons cannot view or access the PI. For illustration purposes, the present description will assume an example of servicing a Data Subject Access Request (DSAR) as the privacy preserving computer operation in which PI of other individuals different from the data subject may need to be obfuscated or redacted, however it should be appreciated that any other computer operations in which privacy of PI is to be preserved may be improved by the mechanisms of the illustrative embodiments without departing from the spirit and scope of the present invention. For example, other computer operations that may be improved by the mechanisms of the illustrative embodiments include data cleaning for data science, replacing personal information in source data for machine learning to reduce unfairness, redacting personal information in order to recue unconscious bias, such as in the case of machine learning training, or the like.

In addition, the illustrative embodiments will be described in the context of electronic mail signature recognition being performed as an improvement to these privacy preserving computer operations, which improves the accuracy and reduces possibilities of unintended exposure of PI. However, it should be appreciated that the improvements provided by the mechanisms of the illustrative embodiments are is equally applicable to any other electronic communications in which signatures may be present within the content of the electronic communication. For example, if an instant messaging protocol or the like permits the use of signatures in the content of the messages, then the present invention may operate on such messages.

As noted above, Data Subject Access Requests (DSARs) allow individuals to obtain their personal data from organizations and companies that hold such personal data. However, complying with DSARs is a difficult and time consuming process that may be very error prone due to the complexities of the intermingling of personal data of various individuals within the same data and the need to preserve the privacy of each of these individuals while still being able to comply with the DSAR request of the data subject. In order to be able to provide the personal data of the data subject in compliance with the DSAR, yet preserve the privacy of other individuals, any personal data of any other individuals that may be present should be obfuscated or redacted. However, such obfuscation or redaction is a labor intensive and error-prone process due to the large amount of personal information (PI), the volume of documents or data structures that must be processed, and the difficulty in distinguishing instances of such personal data within content from other portions of the content. Personal data or personal information is not limited to just names and addresses, but may be any data that alone or in combination with other data may be used to personally identify an individual and/or is considered to be sensitive to the individual and intended to only be accessed by the individual and persons authorized by the individual.

This is especially a problem in electronic communications, such as electronic mail (email), which may be held by organizations and companies, as personal data of multiple individuals is often intermingled in chains or threads of communications exchanged between these multiple individuals over various time periods. For example, it is often the case that signatures are utilized with such emails or electronic communications (assumed to be emails hereafter for ease of explanation). These email signatures frequently contain PI that is difficult to detect using automated machine processes because these signatures are only loosely defined and do not have to follow a predefined structure or have a predefined content. This PI may include job role, team name, calendar information, quotations or sayings, confidentiality statements, names, nicknames, addresses, phone numbers, website Uniform Resource Locators (URLs), pleasantries or signoffs (e.g., “very truly yours” or “sincerely”), or the like, however there is no required structure or specific combination of these that must be present in the content of the signature. Automated machine processes look for specific patterns of content and structure and since email signatures do not have a required structure or content, it is difficult for such automated machine processes to accurately identify such signatures present in emails. As a result, automated machine processes may not accurately identify instances of PI in email chains/threads and may inadvertently disclose that PI to unauthorized individuals as a result, e.g., a data subject submitting a DSAR may receive their own data which may have intermingled into it the PI of other individuals in email signatures that were not accurately identified by the automated machine process.

This problem is even more of an issue when one considers that email signatures may be present in various places of long email chains or threads. That is, when responding or forwarding emails, a copy of the email being responded to or forwarded is appended to the end of the responsive email or forwarding email. This continues as the individuals involved in the email chain continue to reply, respond, and forward emails, such that the signatures of the various emails may appear anywhere in the email chain/thread. There may be multiple different signatures for multiple different individuals appearing at various locations within the email chains/threads, with each separate signature not having to follow the same format, structure, or content as other signatures. Thus, one cannot assume that email signatures only appear at the end of an email or that the signatures are uniform in structure or content.

FIG. 1 is an example diagram illustrating the variability of the location of email signatures (ES) in an email chain or thread 100. As can be seen in FIG. 1, various ES 110-130 may be present in various portions of content 140-160, between headers 170-190. The ES lines can appear in arbitrary order and may or may not start with a signoff such as “regards”, “thank you”, or the like, which makes it challenging to determine the start of an ES block 110-130. PI in an ES 110-130 can be loosely defined as noted above with the various types of information that may be present in an ES 110-130 not being required to follow any specific format or structure. It is not uncommon for a single email chain or thread, which may be represented as an email document, to contain a tangle of multiple quoted or archived email chains/threads, which makes assuming ES lines are only near the bottom 195 of the email document inaccurate, e.g., one would not identify ES 110 and 120 if one assumes that ES only occur at the bottom 195 of the email document.

Due to the variability of email signature structures and content, as well as the variability of the location of email signatures, and the fact that automated machine processes operate on identifying specific patterns and structures, which email signatures do not necessarily have, automated machine processes cannot provide sufficiently accurate results and may in fact miss instances of the presence of email signatures. This is problematic for privacy preserving operations, such as obfuscation or redaction operations, as it is possible for personal information (PI) to be exposed if it is not accurately identified by the automated machine processes. For example, it is possible for PI in email signatures to be exposed if the automated machine processes are not able to accurately identify where such email signatures are present in the email chains and obfuscate or redact the PI in the email signatures.

Thus, as one example, if a company or organization needs to comply with a DSAR from an individual (data subject), the organization must comb through a large volume of data that they may hold, and which may include hundreds or thousands of email communications associated with the data subject, other individuals that communicate with the data subject, and the like. However, the company or organization cannot accurately do so with manual processes which are innately error prone, and if engaging automated machine processes still may inadvertently disclose PI in email signatures as these automated machine processes are not able to provide accurate results for the reasons noted above. That is, these automated machine processes will likely miss instances of PI, especially with regard to email signatures containing such PI. This may expose the organization to additional legal, public relations, and financial problems.

Thus, there is a need for an improved computing tool and improved computing tool operations/functionality that is specifically directed to improving the automated machine processes to accurately and automatically identify signatures in electronic communications, e.g., emails, so that PI within such signatures may be obfuscated or redacted when performing a privacy preserving computer operation. FIG. 2 is an example diagram that further illustrates an example problem statement for the problem of signature identification in electronic communications which is addressed by the improved computing tool and improved computing tool operations/functionality of the illustrative embodiments. As shown in FIG. 2, an example email signature (ES) is shown, where it should be appreciated that the ES is unique to each individual person and contains an arbitrary number of personal information (PI) instances. Examples of types of ES lines are shown in FIG. 2 for illustrative purposes. It should be appreciated that not every ES will have these particular types of lines, which again makes it difficult to distinguish ES lines from non-ES lines.

Thus, one problem addressed by the illustrative embodiments is, given a dataset L having a series of lines extracted from m number of email chains/threads (hereafter referred to as email threads for convenience), each email thread has an arbitrary number of lines (<n lines; n is the largest number of lines among all email threads). Each line in an email thread needs to be classified as either an ES line or not an ES line (non-ES). That is, for each line $$l_i^j,$$

where i is 1 to a value <n and j is 1 to m (m is the number of email threads), the line needs to be classified as to whether it is an ES or not ES. The values of n and m may be determined through data analysis given a dataset L. Once accurately identified as ES or not ES, further operations may then be performed on the ES lines to identify and obfuscate/redact any PI that may be present in these ES lines. Identifying ES lines is important in the accurate identification of PI as PI that may be part of an ES may be loosely defined and thus, generally hard to detect. By focusing PI detection and obfuscation mechanisms on accurately identified ES blocks, targeted identification of PI and obfuscation based on specific types of PI that are found in ES blocks may be performed which leads to more accurate results.

As noted above, due to the variability of structure and content of signatures, there are a number of challenges to identifying ES lines within an email chain/thread or across m email chains/threads in a dataset L. One challenge to making this classification of each email line in a dataset L of m email threads is that the signature lines may not start with a signoff, or pleasantry, line such as "regards", "thank you", "sincerely", "very truly yours", or the like, which makes determining the start of the email signature block difficult. However, it is observed that most ES blocks (a block is a set of one or more lines) that do not start with a signoff line, instead start with a person name, followed by phrase which lacks verbs or auxiliary verbs, e.g., strings of nouns, numbers, contact details. Hence, one solution provided by the illustrative embodiments is to provide a named entity recognition (NER) mechanism to recognize person names, and a natural language processing (NLP) part of speech tagging mechanism to determine if a phrase has verbs or auxiliary verbs. These two features are used to recognize the start of an ES block. That is, if a block has lines that start with a person name and one or more lines that do not have verbs or auxiliary verbs, then this is an indication that those lines may be part of an ES block.

Another challenge to making classifications of email lines is that personal information (PI) in an ES can be loosely defined entities, such as personal quotes, signoff lines, date-of-absence, confidential statements, team names, and the like. The information does not follow any specific format which again makes recognition of ES blocks difficult. However, it is observed that, given a loosely defined ES line, such as a personal quote in an ES block, using only the NER and NLP mechanisms above is not enough, as personal quotes can have verbs and auxiliary verbs, for example. It is difficult to recognize loosely defined personal quotes in a single email and thus, the illustrative embodiments instead exploit the frequency of email lines in email threads from each email sender. If a sentence appears often, and after a person name line, it is more likely that the sentence is part of an ES block. The illustrative embodiments build a knowledge base to store and update the frequency information of sentences per email sender and applies this knowledge base during the ES line classification operations of the illustrative embodiments. If the frequency information indicates a sentence appears equal to or above a threshold number of times after the name of the email sender, then that sentence is considered to be part of an ES block and may be used to identify ES blocks when processing and classifying email lines.

A third challenge to making classifications is that emails can contain multiple entangled quoted/archived email threads, which makes assuming ES lines are only near the bottom of the email inaccurate. However, it is observed that an email thread often has header lines having information of a sender and receivers. Thus, the illustrative embodiments provide mechanisms that classify email lines as email headers to separate multiple emails in email threads. This header classification can then be used as a feature that is evaluated by the machine learning computer models of the illustrative embodiments in identifying ES blocks. For example, in some illustrative embodiments, a relative distance between the headers and the email lines may be used, in combination with other features, to determine whether a particular email line is more likely to be an ES line than a non-ES line, or vice versa, e.g., if the email line is closer to a header of a next email in the email thread, it is more likely to be an ES line than a non-ES line and if it is closer to the header of the current email in the email thread, it is more likely to be a non-ES line than a ES line.

These features and various other features may be used by trained machine learning computer models of the illustrative embodiments to classify each email line as to whether it is an ES line or a non-ES line. The machine learning computer models of the illustrative embodiments utilize both local features and global features as input and generate classifications for each email line of an input dataset L. Local features are those that are extracted from a single email chain or thread. Global features are features that are extracted from and represent features that span multiple email threads associated with the same individual. The trained machine learning computer model uses the local features extracted from email lines of a single email thread and global features extracted from multiple email threads for the same individual, and classifies each email line in an input as to whether or not the email line is an ES line. This classification is then a basis for conversion of the ES lines into annotated ES spans which may then be used by subsequent downstream computer operations to preserve the privacy of PI in the identified and annotated ES spans, e.g., obfuscation/redaction operations may be performed based on a further named entity recognition (NER) and natural language processing (NLP) of the annotated ES span so as to obfuscate or remove any identified instances of PI in the annotated ES spans.

The machine learning computer model that performs the ES line classification is trained on training data comprising email lines of multiple different email threads. Local and global feature extraction is performed on these email lines and the resulting local features (from the current email thread) and global features (across multiple email threads for the same individual) are input to the machine learning computer model for classification of each email line in the email thread. Local features are those that are extracted from a single email thread, e.g., a single .eml file. Global features may be considered a type of "prior knowledge" built from analysis and classification of multiple email threads, e.g., a corpus of several .eml files. The training dataset comprises ground truth labels for each email line in the training dataset specifying whether or not that email line is an ES line or a non-ES line.

As part of the machine learning computer model training, the machine learning computer model processes the local and global features and generates, for each email line, whether that email line is classified as an ES line or a non-ES line. This classification output may be a binary output, e.g., 1 if ES line or 0 if non-ES line, or may be a vector of probability or score values representing a first probability that the email line is an ES line, and a second probability that the email line is a non-ES line. For example, the probability/score value may be on a range from 0.00 to 1.00, with 1.00 being absolute certainty and 0.00 being absolute uncertainty. It should be appreciated that various levels of precision, e.g., decimal values, may be used depending on the desired implementation.

The classification output is compared to the ground truth for the line to determine an error or loss. This error or loss is fed as input to a machine learning training algorithm that determines an adjustment of operational parameters of the machine learning computer model based on a function of the error or loss. The adjustment is intended to reduce the error/loss in subsequent iterations or epochs of the machine learning training operation. This operation may be repeated for a plurality of iterations or epochs until a convergence criterion is satisfied, e.g., the error/loss is equal to or below a predetermined threshold value, or a predetermined maximum number of iterations/epochs have been executed, at which point the machine learning computer model is considered to be a trained machine learning computer model. The machine learning training algorithm may implement any of a number of different machine learning techniques including, but not limited to, logistic regression, decision tree, naïve Bayes classification, gradient boosting frameworks, random forest, k-means clustering, support vector machine, reinforcement learning, and the like. Any known or later developed machine learning training algorithm may be implemented without departing from the spirit and scope of the present invention.

In some illustrative embodiments, the global features extracted from the multiple email chains/threads may include a global metric referred to herein as the frequency of email lines per sender identifier (ID), also referred to herein as the FEL/SID metric. This FEL/SID metric, extracted from the multiple email chains/threads in a large corpus of an organization, improves the F1 score and accuracy of email signature detection. The F1 score is a machine learning evaluation metric that combines two competing metrics, i.e., precision and recall scores of a machine learning computer model, to assess the predictive skill of the machine learning computer model by elaborating on its class-wise performance rather than an overall performance.

In some illustrative embodiments, the email signature detection mechanisms are integrated into a Named Entity Recognition (NER) pipeline that enables recognizing entities in email signature blocks without requiring manually labeled data for new entities. That is, once email lines are classified by the trained machine learning computer model of the illustrative embodiments, specifically based on the local features and global features input to the trained machine learning computer model, and the ES span is generated based on the identified ES lines, the ES spans may be further processed by NER logic of an NER pipeline to identify named entities in the ES span. Moreover, NLP mechanisms may be applied to the ES lines to identify elements of the ES span that may also be considered to be potentially personally identifiable of an individual and thus, personal information (PI). Based on the specific identification of ES spans, and the NER/NLP operations executed on the ES spans, those portions of the ES that are considered to be PI may then be obfuscated/redacted by obfuscation logic to thereby preserve the privacy of the PI when performing a privacy preserving computer operation.

Thus, the present invention is an improved computing tool and improved computing tool operations/functionality that is specifically directed to improving automated machine processes that operate to identify personal information (PI) in electronic communications, and specifically with regard to signatures present in these electronic communications, e.g., emails. The illustrative embodiments provide a trained machine learning computer model based solution where the trained machine learning computer model is specifically trained and configured to identify email signatures in email chains/threads regardless of their location within the email chains/threads and regardless of the variability of the structure and content of the email signatures. The machine learning computer model based solution uses a combination of local features extracted from a single email chain/thread, along with global features extracted from multiple email chains/threads of emails exchanged among multiple involved parties, where these email chains/threads are part of a corpus of a given organization, e.g., a governmental, commercial, or other organization. Based on the identification of ES lines in email threads, PI within these ES lines may be identified, such as by performing NER and NLP operations, and obfuscated/redacted in order to preserve the privacy of such PI when performing privacy preserving computer operations.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides improved computer operations/functionality with regard to identifying personal information (PI) in large volumes of data maintained by organizations, and more specifically with regard to PI that is present in electronic communications data, and even more specifically with regard to signatures of electronic communications. The improved computing tool implements mechanism and functionality, such as the electronic communication signature classification system, which cannot be practically performed by human beings either outside of, or with the assistance of, a technical environment, such as a mental process or the like. The improved computing tool provides a practical application of the methodology at least in that the improved computing tool is able to accurately identify electronic communication signatures, e.g., email signatures, regardless of their particular location within an electronic communication chain/thread, and regardless of variability of the structure and content of the signatures. This improves the accuracy of PI identification specifically with regard to PI that may be present in such signatures. Moreover, this improves the preservation of privacy in privacy preserving computer operations by reducing the likelihood that PI may be inadvertently disclosed to unauthorized individuals due to inaccuracies in the identification of PI in electronic communication signatures.

Figure 3:
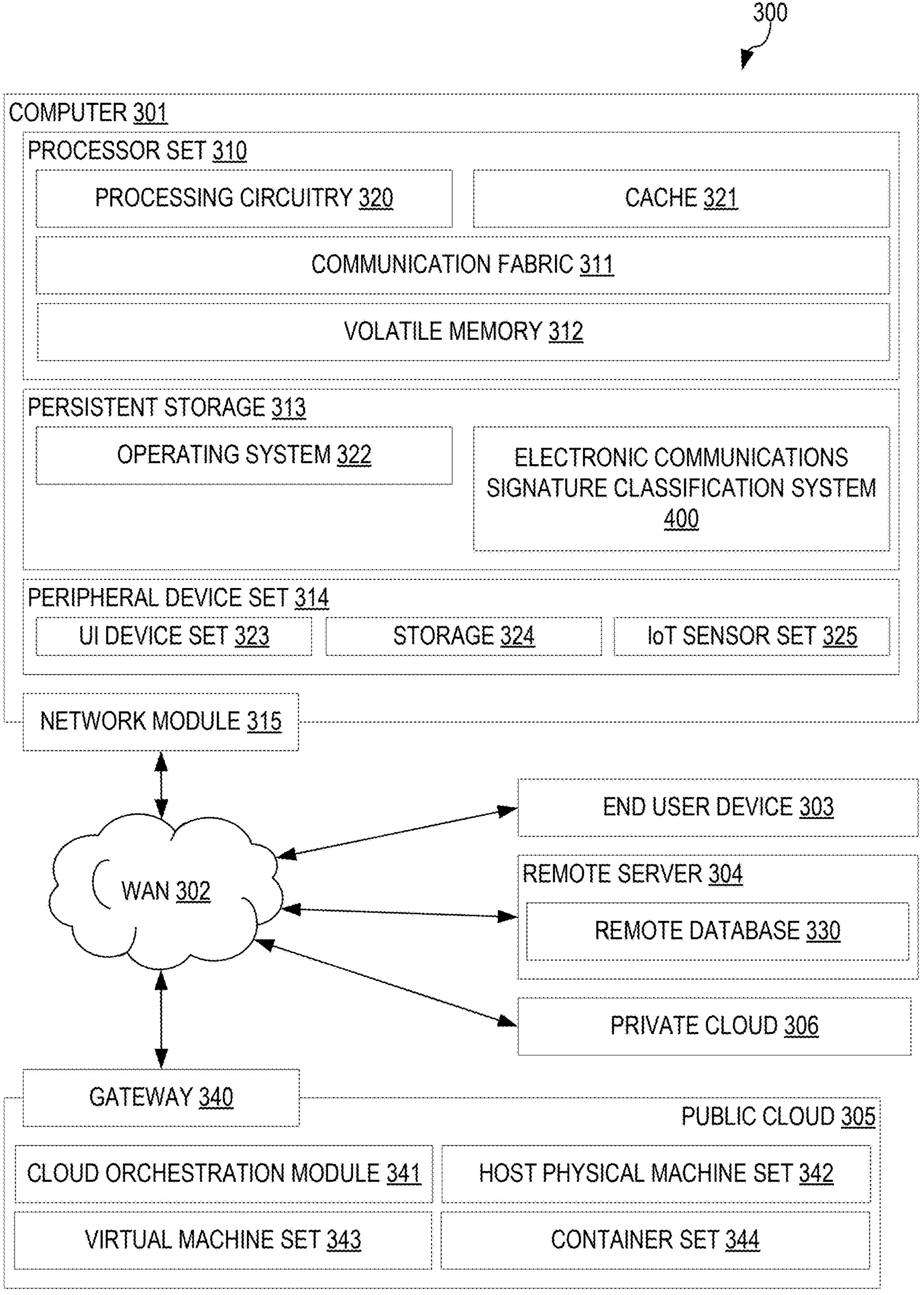
FIG. 3 is an example diagram of a distributed data processing system environment in which aspects of the illustrative embodiments may be implemented and at least some of the computer code involved in performing the inventive methods may be executed.

FIG. 3 is an example diagram of a distributed data processing system environment in which aspects of the illustrative embodiments may be implemented and at least some of the computer code involved in performing the inventive methods may be executed. That is, computing environment 300 contains an example of an environment for the execution of at least some of the computer code involved in performing the inventive methods, such as electronic communications signature classification system 400. In addition to electronic communications signature classification system 400, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and electronic communications signature classification system 400, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in electronic communications signature classification system 400 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in electronic communications signature classification system 400 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

As shown in FIG. 3, one or more of the computing devices, e.g., computer 301 or remote server 304, may be specifically configured to implement an electronic communications signature classification system 400. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 301 or remote server 304, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated identification of signatures in electronic communications regardless of location in electronic communication chains/threads and regardless of the variability of structure and content of the signatures, specifically by providing specially trained machine learning computer models to identity electronic communication signatures based on local and global features. This in turn improves the ability to identify personal information (PI) in signatures of electronic communications so that privacy preserving computer operations may be performed using data in which PI has been obfuscated and/or redacted so as to protect the privacy of individuals.

Figure 4:
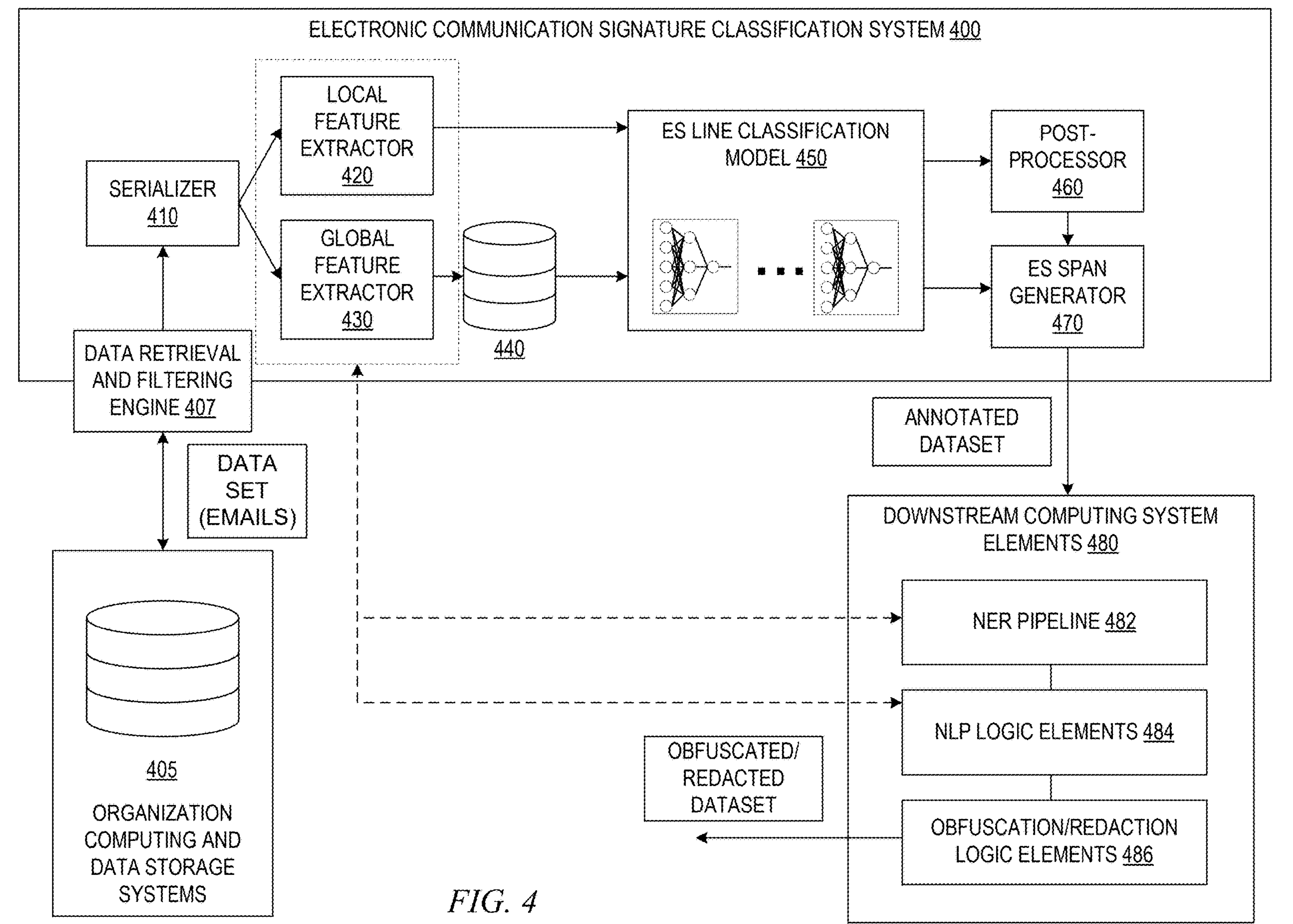
FIG. 4 is an example block diagram illustrating the primary operational components of an electronic communication signature classification system in accordance with one illustrative embodiment.

FIG. 4 is an example block diagram illustrating the primary operational components of an electronic communication signature classification system in accordance with one illustrative embodiment. The operational components shown in FIG. 4 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., a request to perform a privacy preserving computer operation, a data subject access request (DSAR), or the like, and the resulting output may aid human beings, e.g., obfuscated data of a privacy preserving computer operation or DSAR operation. The invention is specifically directed to the automatically operating computer components directed to improving the way that personal information (PI) is identified in large volumes of data and specifically PI that may be present in electronic communication signatures. The present invention provides a specific solution that implements specifically trained machine learning computer models, operating on both local and global features of electronic communication chains/threads, and which perform operations that cannot be practically performed by human beings as a mental process and is not any organization of human activity.

As shown in FIG. 4, the electronic communication signature classification system 400 (hereafter referred to simply as "the system 400" for ease of description) operates on a corpus of data from a data storage, such as a data storage 405 maintained and utilized by an organization, e.g., government, commercial, or other data provider. For example, the corpus of data from the data storage 405 may be provided to the system 400 in response to a data access request, such that appropriate operations may be performed to service the request. In some illustrative embodiments, such a request may be a data subject access request (DSAR) which specifies a data subject, i.e., a particular individual for which the DSAR request is being made.

The system 400 operates on the input data from the data storage 405 which, in the context of the present invention, includes data of electronic communications, e.g., emails, and chains/threads of such electronic communications (assumed to be emails for this description). These emails and email chains/threads are input to the system 400 which operates to classify lines of the emails and email threads as to whether they are email signatures (ES) or not. The system 400 generates for the various emails and email threads, ES spans which are then output to further downstream computing logic and systems to perform privacy preserving computer operations, such as obfuscating/redacting PI present in such ES spans.

As shown in FIG. 4, the system 400 includes a serializer 410, local feature extractor 420, global feature extractor 430, knowledge base 440, ES line classification model 450, post processor 460, and ES span generator 470. The serializer 410 receives the input data from the data storage 405, and specifically the data representing emails and email threads. In some illustrative embodiments, the data that is input may be filtered data based on the specification of a data subject such that the input data may be a subset of all the data stored in the data storage 405. In other words, a data retrieval and filtering engine 407, which may be part of the system 400 or a separate component associated with the data storage 405, may be executed on the data in the data storage 405 to generate a subset of data that is input to the system 400 or further processed by the system 400. Thus, for example, if a DSAR is received specifying a data subject of "John Doe", then all email communications in which the data subject identifier "John Doe" appears may be retrieved by the data retrieval and filtering engine 407 from the data storage 405 and further processed by the system 400.

The input data received by the system 400 is processed by the serializer 410 which splits the contents of the emails into lines and appends them into a single dataset of email lines. The emails are split into lines because the text in one email line is often related together and different from other email lines. Therefore, features extracted from each line can be used to classify that line. For example, on header line has information of a sender email address. Another header line has information of a sender name. Similarly, text in a paragraph (line) in an email often describes the same topic. By splitting the whole email text into lines, the portions of the email may be classified more easily as header, body, or email signature (ES).

In order to parse and identify individual lines in the emails and append them together, in some illustrative embodiments, a document parser may be used that makes use of Internet Message format (RFC2882) and control characters (e.g., carriage return or line feed) in an email body to parse emails into email lines. For example, an email header can have multiple lines: sender email address, receiver email, etc. An email body has multiple lines composed by a sender. Each line can be a phrase, a sentence, or a paragraph. The email lines may be appended into one dataset to more easily build training and testing datasets, but is not a required operation for some illustrative embodiments.

The serialized dataset of email lines are input to the local feature extractor 420 and the global feature extractor 430. The local feature extractor 420 extracts features in each of the email lines by performing various analyses of the data of each line, where these various analyses may utilize named entity recognition (NER), natural language processing (NLP), and other text analysis algorithms to identify and extract features from the text of the email lines. For example, the local feature extractor 420 may perform a word vector similarity analysis with regard to predefined known terms/phrases that are specific to email signatures, such as signoff terms/phrases, by converting the email line to a vector representation and comparing the vector representation to vectors of known email signature terms/phrases vector representations to determine if a similarity is sufficiently high or there is a significant match, e.g., a similarity measure equal to or greater than a threshold.

For example, in some illustrative embodiments, various popular email signoff lines T may have word-vector embeddings precomputed and stored in a data storage associated with the local feature extractor 420. Examples of such popular email signoff lines, or pleasantries, may include "regards", "truly yours", "sincerely", "with thanks", and the like. The word-vector embedding $e_t(t \in T)$ of these various popular email signoff lines may be compared to the embedding $$e_{l_i^j}$$

of the email line $$l_i^j \in L.$$

This comparison may involve a similarity measurement between the embeddings, such as a max cosine similarity measure. This helps to determine if the email line is the start of an ES block or not.

In other analysis, the local feature extractor 420 may determine a number of person names present in the email line. The local feature extractor 420 may use named entity recognition to identify person names in email lines, for example. The results of such analysis may be used in combination with the analysis of other email lines of the same email or email thread to determine if the email lines are part of the same email signature (ES) block. For example, if the email line has one person's name, this is good evidence that the email line may be the start of an ES block. Having more than one person's name is a counter indicator, i.e., having more than one person's name is indicative of the email line being less likely to be the start of an ES block.

The local feature extractor 420 may perform a "has-verb" analysis to determine if the email line has a verb or auxiliary verb present in the email line. The "has-verb" analysis may utilize natural language processing (NLP) logic to perform part-of-speech tagging of terms used in email lines to thereby determine if the email line includes a verb or auxiliary verb. Email lines that do not have verbs or auxiliary verbs are good evidence that the email line is the start of, or part of, an ES block. Again, the results of such analysis may be used in combination with the analysis of other email lines in the same email or email thread to determine if the email line is part of an ES block.

In other analysis, the local feature extractor 420 may perform an "is-header" analysis to determine if the email line is part of a header in the email or not. This analysis may look at the format and content of the email line to determine if the email line text has terms/phrases indicative of a header, such as "to:", "from:", "subject:", etc. In some cases, metadata associated with the email line, e.g., tags and the like, may be indicative of the email line being part of a header. The results of this analysis may be used to determine if other email lines are more or less likely to be email signatures or not based on a relative distance to email lines that are part of a header. The "is-header" analysis helps delineate emails in an email thread, and the distance evaluation determines whether the email line is more or less likely to be part of an ES block.

The local feature extractor 420 may implement rule-based engines, machine learning models, and the like, to perform the various analyses and generate resulting features that are then provided as input to the ES line classification model 450. That is, the local feature extractor 420 provides a local feature vector input to the ES line classification model 450. The local feature vector input may have values specifying the results of the various analyses such as a value indicating whether the email line is a match to a signoff line, the number of person names in the email line, whether the email line has verbs or auxiliary verbs, whether the email line is part of a header, and the like. These are only examples of the various local features that may be extracted from the email line itself or email lines that are part of the same email thread, and other local features, either in addition to, or in replacement of, these local features may be extracted and utilized without departing from the spirit and scope of the present invention.

Similarly, the global feature extractor 430 performs analyses on the serialized data set from the serializer 410, but rather than extracting features from individual email lines within the same email thread, performs a global feature extraction from a plurality of email lines that span a plurality of email threads. In particular, in one illustrative embodiment, the global feature extractor 430 extracts an email sender's identifier from the email lines of an email or email thread, and updates a global feature referred to herein as the frequency of email lines per sender identifier, or FEL/SID metric. The FEL/SID metric may be generated for each unique sender identifier, e.g., sender email address, sender name, or other sender identifier, and stores for each unique phrase or sentence used by that sender ID in emails, a corresponding count and FEL/SID metric. Other types of global features that may be extracted and utilized by the illustrative embodiments include a collection of signature lines used by each email sender. This is useful to improve recognizing the start of an ES block. Moreover, another global feature may be the line frequency across email senders, which is different from the line frequency per email sender. This feature is helpful when there is only one email from a sender observed so far. F1 the line is used often by other senders, and is after the start of an ES block, then this line is likely part of the ES. For example, people in the same team can use the same team name in the ES block. Other global features may also be identified and extracted and used to distinguish ES lines from non-ES lines of emails in accordance with one or more illustrative embodiments.

The extraction of the FEL/SID metric for each of the phrases/sentences is based on the observation that if a person repeatedly sends the same phrases or sentences, these phrases and sentences, due to their frequency of use, are more likely appearing as part of the person's email signature. In other words, email signatures are often utilized at the end of each email sent by an email sender and thus, the phrases and sentences in the email signature will have a much higher frequency of occurrence in the dataset than other phrases or sentences. Thus, rather than performing email signature classification only on local features within the email or email thread, global features, such as the FEL/SID metric, may be used to provide a more accurate determination of email lines being part of an ES or not part of an ES.

The FEL/SID metric, in some illustrative embodiments, is a ratio between the number of appearances of a phrase/sentence s in an email line over the number of different emails $l_j(\in L)$ sent from the same sender identifier. For example, in some illustrative embodiments the FEL/SID metric is calculated as follows:

$$F(senderID, s) = \frac{\sum_{l^j \in L^{senderID}} \left[s = l_i^j\right]}{\sum_{l^j \in L^{senderID}} [1]} \tag{1}$$

Where $L^{senderID}$ is the set of email threads sent from the sender identifier (senderID), and where $L^{senderID}$L, where L is the set of all email lines. In some illustrative embodiments, the senderID is a standardized sender email address, as email addresses may have different formats. The denominator is the size of $L^{senderID}$ i.e., the set of email threads sent from the sender identifier, which in this case is [1]. The denominator can also be written as $|L^{senderID}|$. This feature value represents how frequently a sender uses the line in all of the sender's emails.

To avoid exposing email text and incidental PI from email senders, in storing the FEL/SID metric in some illustrative embodiments only the one-way hashes of email lines are stored in the knowledge base 440 for use as inputs to the ES line classification model 450. For example, for each unique phrase/sentence, a <key, value> pair may be stored in a secured data storage of the knowledge base 440. In such a case, the above function for the FEL/SID metric, as well as the corresponding key and value for the <key, value> pair may be as follows:

$$F(senderID, \text{hash}(s)) = \sum_{l^j \in L^{senderID}} \left[\text{hash}(s) - \text{hash}\left(l_i^j\right)\right] / \sum_{l^j \in L^{senderID}} [1] \tag{2}$$

$$\text{Key} = (senderID, \text{hash}(s)) \tag{3}$$

$$\text{Value} = \left[\sum_{l^j \in L^{senderID}} \left[\text{hash}(s) = \text{hash}\left(l_i^j\right)\right], \sum_{l^j \in L^{senderID}} [1]\right] \tag{4}$$

The extraction and use of the global features, such as the FEL/SID metric for the various phrases/sentences, from across the multiple email chains/threads in a large corpus of an organization improves the F1 score and accuracy of email signature detection.

The global features extracted by the global feature extractor 430 are used to update the global features in the knowledge base 440. These global features, for the sentences/phrases in the actual email line, are fed as input vectors to the ES line classification model 450 from the knowledge base 440. The ES line classification model 450 processes the local features and global features to generate a classification for each email line as to whether it is an ES line or a non-ES line.

In some illustrative embodiments, the ES line classification model 450 is a trained machine learning computer model that identifies patterns of features in the inputs and generates a binary output classification or a probability value (or score) for the input as to whether the input should be classified as corresponding to an ES line or a non-ES line. The ES line classification model 450 in some illustrative embodiments may be a single trained machine learning computer model that processes all of the input local and global features and generates the resulting classification output, or in other illustrative embodiments may be a plurality of trained machine learning computer models, such as an ensemble of machine learning computer models that each process all, or a separate subset of, the input features and generate separate classification outputs which are then combined to determine a final classification output.

For example, in some illustrative embodiments, each of the trained machine learning computer models in the plurality of trained machine learning computer models may process all of the input features and generate a classification output. Due to differences in the training process, different configurations of the machine learning computer models, or the like, the machine learning computer models may generate different classification outputs. The various classification outputs may be combined through combinatorial logic to determine a final classification output, such as by averaging the classification outputs, majority vote evaluation, mean value determination, largest value determination, or any other suitable evaluation for determining a final classification output for the plurality of machine learning computer models.

In other illustrative embodiments, rather than each machine learning computer model processing the same full set of input features, different machine learning computer models may process different ones and combinations of the input features. For example, one trained machine learning computer model may operate on just the local features while another machine learning computer model may operate on the global features, or one trained machine learning model may operate on one subset of local and global features while another may operate on another different subset of local and global features, which may or may not overlap with each other to a certain extent.

In these illustrative embodiments with a plurality of machine learning computer models, there would still be combinatorial logic that operates to generate a single final classification output based on the outputs from the various machine learning computer models. This combinatorial logic may, in some illustrative embodiments, be another machine learning computer model that receives as input the output classifications from the various other trained machine learning computer models and is trained to generate a final output classification based on the input classification outputs received from the other machine learning computer models. This combinatorial machine learning computer model may be trained to weight different ones of the output classifications from these machine learning computer models differently based on the training.

The final classification outputs may be further provided by the ES line classification model 450 to a post processor 460 which handles special cases, such as cases where the email line includes confidentiality statements, attached file names, or cannot be sufficiently classified as ES or non-ES. For example, for email lines having paths to attached files, these email lines often have the same pattern such as (path/to/file), and some regular expressions may be used to detect these lines as part of an ES block. For email lines having confidentiality statements, they often have keywords, such as "confidential", "confidentiality", and the like, such that regular expressions can be used to detect these lines as part of an ES block.

The output from the ES line classification model 450 and/or post processor 460 may be input to the ES span generator 470 which converts the ES lines identified in the email or email thread into ES spans. An ES span has the start index and end index of the ES block. The start index is where the ES block starts in the parsed email. The first character in an email has index 0. The end index is where the ES block ends in the parsed email. These indices help redact the ES block from the parsed email.

The ES span generator 470 may generate appropriate metadata to identify which email lines are part of the ES span and which are not part of the ES span. For example, metadata for email lines that are part of the ES span may be of the type (ES line, start index, end index, tag: EMAIL_SIGNATURE). In cases where the non-ES lines are similarly marked or tagged in metadata, the metadata for a non-ES line may be (non-ES line, start index, end index, tag: NOT_SIGNATURE) or the like. In this way, the email lines of an email or email thread in the dataset may be annotated to specify which email lines are classified as ES lines and which are non-ES lines.

The annotated email lines may be output to further downstream computing system elements 480 for further processing and performance of the privacy preserving computer operation, e.g., responding to a DSAR. For example, as shown in FIG. 4, these further downstream computing system elements 480 may include further stages of the NER pipeline 482, natural language processing (NLP) logic elements 484, and obfuscation/redaction logic elements 486. For example, the downstream computing system elements 480 may parse the annotated email lines, perform named entity recognition and natural language processing on the email lines to identify PI present in the email lines, and obfuscated/redact the PI found in the email lines. The identification of the ES lines allows these downstream computing system elements 480 to focus the processing to ES lines present in the emails and email threads.

Identifying ES lines, in accordance with the illustrative embodiments, improves the identification and obfuscation/redaction of PI and other downstream computer operations that must preserve PI from unauthorized disclosure, because ES line identification permits targeted and specialized PI identification and obfuscation operations that are specifically directed to PI that appears in ES lines of emails. That is, PI may be loosely defined and thus, is not limited to just well-defined PIs that can be identified using existing named-entity recognition models. To the contrary, general named-entity recognition models often are unable to accurately identify loosely defined entities such as job title, team names, confidentiality lines, personal quotes, etc. By detecting ES lines, and targeting subsequent PI identification and obfuscation on these specific ES lines, the likelihood of producing false negatives (PIs not detected) when identifying PI may be reduced. Moreover, by identifying ES lines and performing targeted PI identification and obfuscation, costs, time, and delays associated with having to label data and fine-tune or retrain named-entity recognition models may be reduced or avoided.

Thus, the illustrative embodiments provide an improved computing tool and improved computing tool operations/functionality that identifies email signatures present in emails and/or email threads so that the identification of PI instances may be focused or targeted on these email signatures. This improves the overall obfuscation/redaction of PI and the privacy preserving computer operations performed by minimizing the likelihood that PI may be inadvertently disclosed to unauthorized parties.

Figure 5:
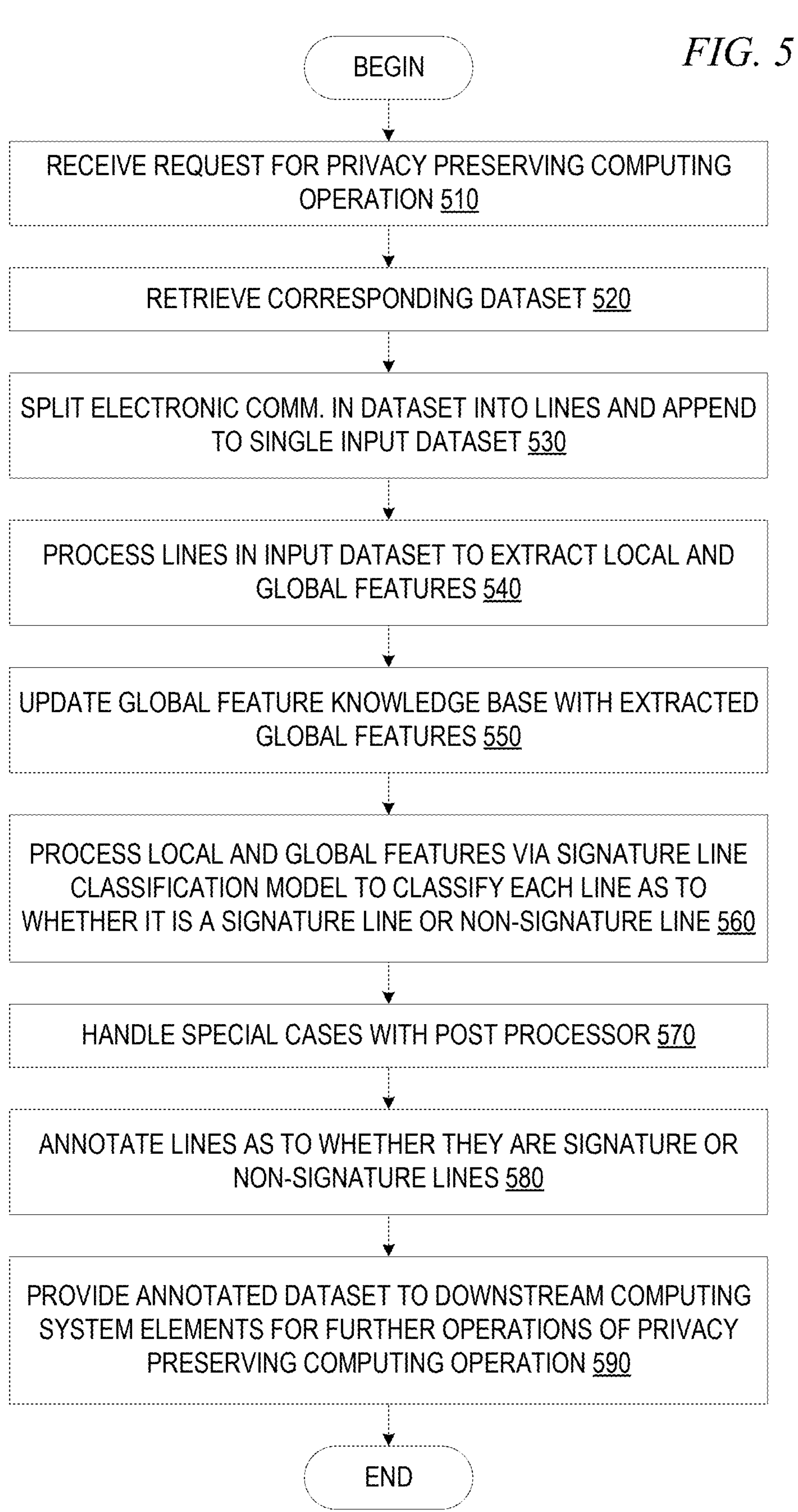
FIG. 5 is an example flowchart outlining an example operation of an electronic communication signature classification system in accordance with one illustrative embodiment.

FIG. 5 presents a flowchart outlining example operations of elements of the present invention with regard to one or more illustrative embodiments. It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 5, and may, in some cases, make use of the results generated as a consequence of the operations set forth in FIG. 5, the operations in FIG. 5 themselves are specifically performed by the improved computing tool in an automated manner.

The operation outlined in FIG. 5 assumes a prior machine learning training of the email signature (ES) line classification computer model through a machine learning training operation on local and global features extracted from a training dataset as described above. As shown in FIG. 5, the operation starts by receiving a request to perform a privacy preserving computing operation, such as a Data Subject Access Request (DSAR) or the like (step 510). The dataset corresponding to the privacy preserving computing operation is retrieved from data storage (step 520). This dataset comprises, in the context of the present invention, a plurality of electronic communications that are to be processed to obfuscate/redact personal information (PI) from these electronic communications prior to performing further downstream computing operations to respond to the request. The electronic communications in the dataset are split into lines of text and are appended into a single input dataset (step 530).

The input dataset is then processed in parallel paths to extract local features and global features (step 540). The global features are used to update a knowledge base of global features (step 550). The global features from the knowledge base are input along with the local features to a signature line classification model which processes the features and generates, for each line in the input dataset, a classification output specifying whether or not the line is considered to be a signature line or a non-signature line (step 560). Special cases are processed by a post-processor (step 570) and the classifications of each line obtained from the signature line classification model and post-processor are used to annotate the lines as to whether they are signature or non-signature lines (step 580). The annotated dataset is then provided to downstream computing system elements to perform further downstream computer operations for responding to the original request (step 590). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method in a data processing system, for executing a privacy preserving computing operation, the method comprising:

retrieving a set of data, from a data storage, that comprises a first electronic communication corresponding to the privacy preserving computing operation;

extracting first features from one or more first lines of the first electronic communication;

processing, by one or more trained machine learning computer models, the extracted first features as input to the one or more trained machine learning computer models and which generate classification outputs for the one or more first lines, wherein the one or more trained machine learning computer models process the first features and generate a classification output for each first line in the one or more first lines, which specifies, for a corresponding first line in the one or more first lines, a corresponding classification of the corresponding first line as to whether it is a signature line or non-signature line, based on patterns in the first features;

processing, by the one or more trained machine learning computer models, extracted second features extracted from one or more second lines of one or more other second electronic communications in the set of data, to generate the classification output for each first line in the one or more first lines of the first electronic communication, wherein the first features are local features corresponding to a first electronic communication thread in which the first electronic communication is a part, and wherein the second features are global features corresponding to the one or more other second electronic communications which are not part of the first electronic communication thread;

annotating each first line in the one or more first lines with metadata specifying the corresponding classification of the first line based on the classification output, to thereby generate an annotated set of data; and executing the privacy preserving computing operation on the first electronic communication based on the annotated set of data.

2. The computer-implemented method of claim 1, wherein executing the privacy preserving computing operation comprises:

processing the one or more first lines of the first electronic communication that are annotated as being signature lines to identify one or more instances of personal information present in the one or more first lines; and obfuscating the one or more instances of personal information to generate obfuscated electronic communication data.

3. The computer-implemented method of claim 2, wherein executing the privacy preserving computing operation further comprises executing one or more operations to service a data subject access request (DSAR) based on the obfuscated electronic communication data.

4. The computer-implemented method of claim 1, wherein processing, by the one or more trained machine learning computer models, the extracted first features as input to the trained machine learning computer model which generates classification outputs for the one or more first lines, comprises processing, by the one or more machine learning computer models, first features from a plurality of the first lines of the first electronic communication in combination to identify a signature block of the first electronic communication based on a pattern of features from the plurality of first lines.

5. The computer-implemented method of claim 4, wherein identifying the signature block of the first electronic communication based on the pattern of features from the plurality of first lines comprises executing named entity recognition and natural language processing on a subset of the plurality of first lines to extract named entities and part of speech information for text in the subset of the plurality of first lines, wherein the subset comprises a portion of the plurality of first lines identified as being part of the signature block.

6. The computer-implemented method of claim 5, wherein identifying the pattern of features by executing the named entity recognition and natural language processing on the subset of the plurality of first lines comprises identifying, by the named entity recognition, a person name followed by one or more subsequent first lines that do not have verbs or auxiliary verbs present in the one or more subsequent first lines, as determined by the natural language processing.

7. The computer-implemented method of claim 1, further comprising maintaining a knowledge base with frequency information specifying, for each electronic communication sender, and for each phrase or sentence present in lines of electronic communications sent by the electronic communication sender, a frequency of occurrence, and wherein processing, by the one or more trained machine learning computer models, the extracted first features and extracted second features, further comprises processing the frequency information in the knowledge base to classify the one or more first lines of the first electronic communication.

8. The computer-implemented method of claim 1, further comprising generating, for each unique sender identifier of each sender of electronic communications in the set of data, and for each phrase or sentence present in lines of electronic communications sent by each sender of electronic communications, a frequency of email lines per sender identifier (FEL/SID) metric, wherein the FEL/SID metric is a ratio of a number of appearances of the corresponding phrase or sentence in an electronic communication line over a number of different electronic communications sent by the same unique sender identifier, and wherein the FEL/SID metric is processed by the one or more trained machine learning computer models along with the first features to classify the one or more first lines.

9. The computer-implemented method of claim 1, further comprising training the one or more machine learning computer models through an iterative machine learning training process, until a convergence condition is reached, based on a training dataset that is input to the one or more machine learning computer models, wherein:

the training dataset comprises electronic communication lines for multiple different electronic communication threads and corresponding ground truth labels for each electronic communication line in the training dataset specifying whether the corresponding electronic communication line is a signature line or not a signature line, and the one or more machine learning computer models are trained to classify the input electronic communication lines of the electronic communications in the training dataset as to whether they are signature lines or non-signature lines at least by processing features of the input electronic communication lines, generating a predicted classification output for each input electronic communication line, comparing the predicted classification output to a corresponding ground truth label for each input electronic communication line to determine an error, and executing a machine learning training algorithm on the error to adjust operational parameters of the one or more machine learning computer models to reduce the error.

10. A computer program product comprising a computer readable storage medium having a computer readable program stored therein, wherein the computer readable program, when executed on a computing device, causes the computing device to:

retrieve a set of data, from a data storage, that comprises a first electronic communication corresponding to a privacy preserving computing operation;

extract first features from one or more first lines of the first electronic communication;

process, by one or more trained machine learning computer models, the extracted first features as input to the one or more trained machine learning computer models and which generate classification outputs for the one or more first lines, wherein the one or more trained machine learning computer models process the first features and generate a classification output for each first line in the one or more first lines, which specifies, for a corresponding first line in the one or more first lines, a corresponding classification of the corresponding first line as to whether it is a signature line or non-signature line, based on patterns in the first features;

process, by the one or more trained machine learning computer models, extracted second features extracted from one or more second lines of one or more other second electronic communications in the set of data, to generate the classification output for each first line in the one or more first lines of the first electronic communication, wherein the first features are local features corresponding to a first electronic communication thread in which the first electronic communication is a part, and wherein the second features are global features corresponding to the one or more other second electronic communications which are not part of the first electronic communication thread;

annotate each first line in the one or more first lines with metadata specifying the corresponding classification of the first line based on the classification output, to thereby generate an annotated set of data; and execute the privacy preserving computing operation on the first electronic communication based on the annotated set of data.

11. The computer program product of claim 10, wherein the computer readable program further causes the computing device to execute the privacy preserving computing operation at least by:

processing the one or more first lines of the first electronic communication that are annotated as being signature lines to identify one or more instances of personal information present in the one or more first lines; and obfuscating the one or more instances of personal information to generate obfuscated electronic communication data.

12. The computer program product of claim 11, wherein the computer readable program further causes the computing device to execute the privacy preserving computing operation at least by executing one or more operations to service a data subject access request (DSAR) based on the obfuscated electronic communication data.

13. The computer program product of claim 10, wherein the computer readable program further causes the computing device to process, by the one or more trained machine learning computer models, the extracted first features as input to the trained machine learning computer model which generates classification outputs for the one or more first lines, at least by processing, by the one or more machine learning computer models, first features from a plurality of the first lines of the first electronic communication in combination to identify a signature block of the first electronic communication based on a pattern of features from the plurality of first lines.

14. The computer program product of claim 13, wherein identifying the signature block of the first electronic communication based on the pattern of features from the plurality of first lines comprises executing named entity recognition and natural language processing on a subset of the plurality of first lines to extract named entities and part of speech information for text in the subset of the plurality of first lines, wherein the subset comprises a portion of the plurality of first lines identified as being part of the signature block.

15. The computer program product of claim 14, wherein identifying the pattern of features by executing the named entity recognition and natural language processing on the subset of the plurality of first lines comprises identifying, by the named entity recognition, a person name followed by one or more subsequent first lines that do not have verbs or auxiliary verbs present in the one or more subsequent first lines, as determined by the natural language processing.

16. The computer program product of claim 10, wherein the computer readable program further causes the computing device to maintain a knowledge base with frequency information specifying, for each electronic communication sender, and for each phrase or sentence present in lines of electronic communications sent by the electronic communication sender, a frequency of occurrence, and wherein processing, by the one or more trained machine learning computer models, the extracted first features and extracted second features, further comprises processing the frequency information in the knowledge base to classify the one or more first lines of the first electronic communication.

17. The computer program product of claim 10, wherein the computer readable program further causes the computing device to generate, for each unique sender identifier of each sender of electronic communications in the set of data, and for each phrase or sentence present in lines of electronic communications sent by each sender of electronic communications, a frequency of email lines per sender identifier (FEL/SID) metric, wherein the FEL/SID metric is a ratio of a number of appearances of the corresponding phrase or sentence in an electronic communication line over a number of different electronic communications sent by the same unique sender identifier, and wherein the FEL/SID metric is processed by the one or more trained machine learning computer models along with the first features to classify the one or more first lines.

18. An apparatus comprising:

at least one processor; and at least one memory coupled to the at least one processor, wherein the at least one memory comprises instructions which, when executed by the at least one processor, cause the at least one processor to:

retrieve a set of data, from a data storage, that comprises a first electronic communication corresponding to a privacy preserving computing operation;

extract first features from one or more first lines of the first electronic communication;

process, by one or more trained machine learning computer models, the extracted first features as input to the one or more trained machine learning computer models and which generate classification outputs for the one or more first lines, wherein the one or more trained machine learning computer models process the first features and generate a classification output for each first line in the one or more first lines, which specifies, for a corresponding first line in the one or more first lines, a corresponding classification of the corresponding first line as to whether it is a signature line or non-signature line, based on patterns in the first features;

process, by the one or more trained machine learning computer models, extracted second features extracted from one or more second lines of one or more other second electronic communications in the set of data, to generate the classification output for each first line in the one or more first lines of the first electronic communication, wherein the first features are local features corresponding to a first electronic communication thread in which the first electronic communication is a part, and wherein the second features are global features corresponding to the one or more other second electronic communications which are not part of the first electronic communication thread;

annotate each first line in the one or more first lines with metadata specifying the corresponding classification of the first line based on the classification output, to thereby generate an annotated set of data; and execute the privacy preserving computing operation on the first electronic communication based on the annotated set of data.

* * * * *